United States Patent [19]

Shoemaker et al.

[11] Patent Number: 5,150,199
[45] Date of Patent: Sep. 22, 1992

[54] METHOD FOR CORRELATING COLOR MEASURING SCALES

[75] Inventors: Martin L. Shoemaker, Hopkins; Dana N. Hughes, Wyoming; Steven L. Kuchta, Comstock Park, all of Mich.

[73] Assignee: Megatronics, Inc., Grand Rapids, Mich.

[21] Appl. No.: 459,542

[22] Filed: Jan. 2, 1990

[51] Int. Cl.$^5$ .............................................. H04N 9/64
[52] U.S. Cl. .................................. 358/21 R; 340/793; 358/80
[58] Field of Search ................ 358/107, 21 R, 76, 80, 358/17; 340/793

[56] References Cited

U.S. PATENT DOCUMENTS

| | | | |
|---|---|---|---|
| 4,481,529 | 11/1984 | Kerlin | 340/793 |
| 4,641,971 | 2/1987 | Korth | 358/107 |
| 4,688,031 | 8/1987 | Haggerty | 340/793 |

Primary Examiner—James J. Groody
Assistant Examiner—Glenton B. Burgess
Attorney, Agent, or Firm—Price, Heneveld, Cooper, DeWitt & Litton

[57] ABSTRACT

A method for converting video RGB values developed in a digital video color analysis system into standard tristimulus or CIELAB values or the like comprises empirically determining separate RGB and XYZ color values for a plurality of colors; determining by regression analysis the value of X as a function of R, the value of Y as a function of G, and the value of Z as a function of B, using only gray scale colors where the RGB values are approximately the same; determining the X value by further regression analysis determined to find X as a function of the previously computed values of the multiple variable X, Y and Z, using color values including colors where the RGB values are not identical; determining an intermediate value of Y in the same manner as the foregoing value of X; performing an additional regression analysis to find a second intermediate value of Y as a function of the second intermediate value of Y; determining an error value representative of the difference between Y and the first intermediate value of Y and performing a regression analysis to determine the error value as a function of the value of the red chroma; and subtracting the red chroma function from the second intermediate value of Y to obtain the value of Y corresponding to the measured RGB values. The X, Y, and Z values thus determined are representative of video RGB values for the same colors with a high degree of accuracy.

16 Claims, 1 Drawing Sheet

METHOD FOR CORRELATING COLOR MEASURING SCALES

BACKGROUND OF THE INVENTION

Describing color is a subjective phenomenon, involving the perspective of the observer and the difficulties in verbally expressing the characteristics of the color, such as reddish-green or bluish-green or the like. To avoid the problems inherent in individual color observations, a number of objective color scales have been developed, wherein colors are expressed in numerical values according to various coordinate systems. One of the earliest color systems was developed in 1905 by Albert Munsell. This system, which is still used today, is called the Munsell System of Color Notation. The Munsell system assigns numerical values to three properties of color: hue, value, and chroma. Hue is generally thought of as the color (red, green or blue or combination) that one would observe. Value is the measure of the lightness or darkness of a color, with color values running from black to white. Chroma is a measure of the intensity or saturation of a color. Munsell developed a three dimensional physical model representing the various colors, with the colors or hues being arranged in continuous form in a circle, value extending along the axis of the circle and chroma extending radially outwardly from the axis of the circle.

Today there are mathematical scales representative of hue, value, and chroma properties of colors. The most important of these is a standardized system developed by the International Commission on Illumination ("CIE"). This organization has developed two principal color scales for numerically expressing color values. These scales are the CIEIAB and CIELUV scales. These scales are mathematically related and are in turn related to a so-called "tristimulus" scale, wherein colors are expressed in terms of X, Y, and Z coordinates. The CIELAB and CIELUV scales are used in preference to the tristimulus XYZ coordinates, because the tristimulus coordinates are believed to correlate less accurately with the visual attributes of a color. Standardized color scales such as CIELAB are widely used in industrial applications and are the standards in the industry.

Instruments generally used for color analysis include the spectrophotometer, colorimeter, and densitometer. These instruments vary in the manner in which they produce output, but all basically produce a numerical analysis of an average color on a viewing surface in terms of three principal components. The data produced by these instruments can be expressed in terms of tristimulus coordinates, CIELAB coordinates or coordinates of other related color scales.

An improved method for analyzing and comparing colors involves the use of color video cameras and computer digitizing equipment. With this equipment, colors are viewed by a video camera and digitized into their respective color values, typically numeric values representative of red, green and blue values ("RGB"). These numeric values can be manipulated for color analysis and comparison in the same manner as the more standard CIELAB or tristimulus values. The use of video equipment provides important additional data however, since the video equipment is capable of producing component values over a given area on a pixel by pixel basis, and the varying colors represented by the different pixel locations can be analyzed and compared on a statistical basis to produce data representative of the color variation patterns over a viewing surface. Applicant's U.S. Pat. No. 4,812,904 is illustrative of such a system.

When RGB values are developed by a video camera, the RGB scale for each video camera tends to have a unique bandwidth configuration, which can vary in significant respects from the RGB scale of a different camera. Actually, the reference to RGB signals in such applications really means that the instrument breaks down energy readings in the visible spectrum to three distinct bands. As used herein, the term "RGB" or "video RGB" refers to the general class of RGB scales developed by different instruments. RGB scales can be developed by instruments such as colorimeters in addition to video cameras, but the video camera has broader capabilities than the colorimeter.

RGB values developed by video cameras are perfectly acceptable from a functional standpoint as a means for numerically describing and comparing colors. In such a case, each individual camera is calibrated by reference to standard color samples, so the unique variations among color scales has no effect. The variations in RGB scales, however, precludes the use of a single formula or set of data for expressing the video RGB values in any standard scale or translating RGB values to a different standard color coordinate system, such as tristimulus XYZ values or CIELAB or CIELUV. RGB values thus encounter some resistance from persons who feel more comfortable using industry standard tristimulus or CIELAB values.

There is a so-called "standard" RGB scale, but such a scale cannot be produced with conventional video equipment. The standard RGB scale can only be developed by special equipment with very precise sensors of a particular nature found in filter colorimeters. There are known formulae for converting standard RGB values to standard tristimulus values, but there is no known method for converting RGB scales in general to tristimulus coordinates.

The purpose of the present invention is to develop a method for converting or correlating numerical RGB values developed by different instruments into standard tristimulus values. Tristimulus values then can be converted by known mathematical formulae to any of the desired standardized color scales in use in industry.

The present invention provides a system in which a video camera may be used to obtain standard color values from a desired object. More particularly, the present invention provides a system by which a video camera may be used to generate RGB values from an imaged object, and the RGB values so generated may then be converted to standard values. A salient attribute of the present system is that it allows different video cameras which produce non-standard RGB values to output uniform values.

In a still more particular sense, the present invention uses iterative regression analysis to determine initial functions which convert RGB values generated by a video camera from initial colors to standard XYZ values. Regression analysis is then used to determine additional functions which convert RGB values generated by the video camera viewing additional colors different than the initial colors to standard XYZ values. The functions generated for the video camera are then used to convert RGB values generated by the video camera in imaging a colored object to standard XYZ values.

Accordingly, the system of the present invention enables the use of an RGB video camera to generate signals representing the standardized color codes for the object imaged by the camera.

These and other features and attributes of the invention will become more apparent after contemplation of the ensuing more detailed description.

DETAILED DESCRIPTION OF THE PREFERRED EMBODIMENT

Referring in more detail to the method of the present invention, the difficulty with converting video RGB values to standard XYZ values is that the XYZ values do not correlate with the RGB values directly and the RGB values are not the same for any two video cameras. While Y is a greenish color and Z is a bluish color and X is a reddish color, Y also represents lightness, and the three values do not represent pure red, green or blue but include the other colors as well. Thus, X does not vary in accordance with R alone but also varies in accordance with changes in green or blue. The changes in relationship are not linear.

Figure 1:
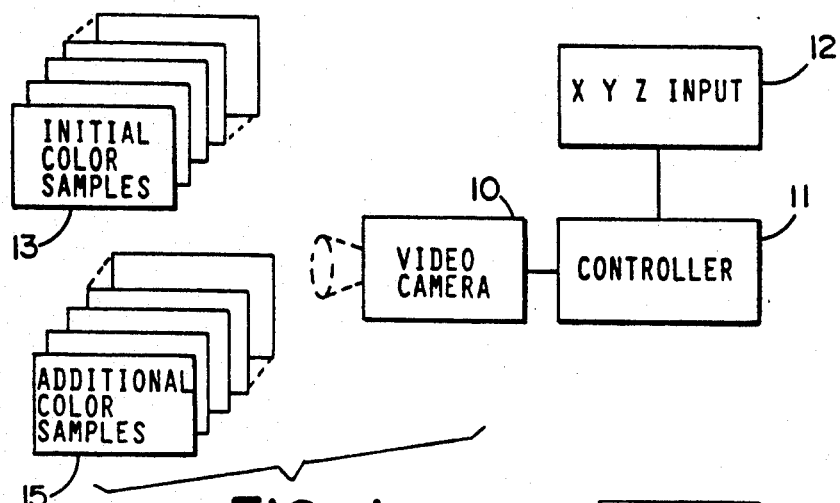
FIG. 1 is a block diagram of a system generating equations which produce tristimulus XYZ values from RGB values output by a video camera.
Figure 2:
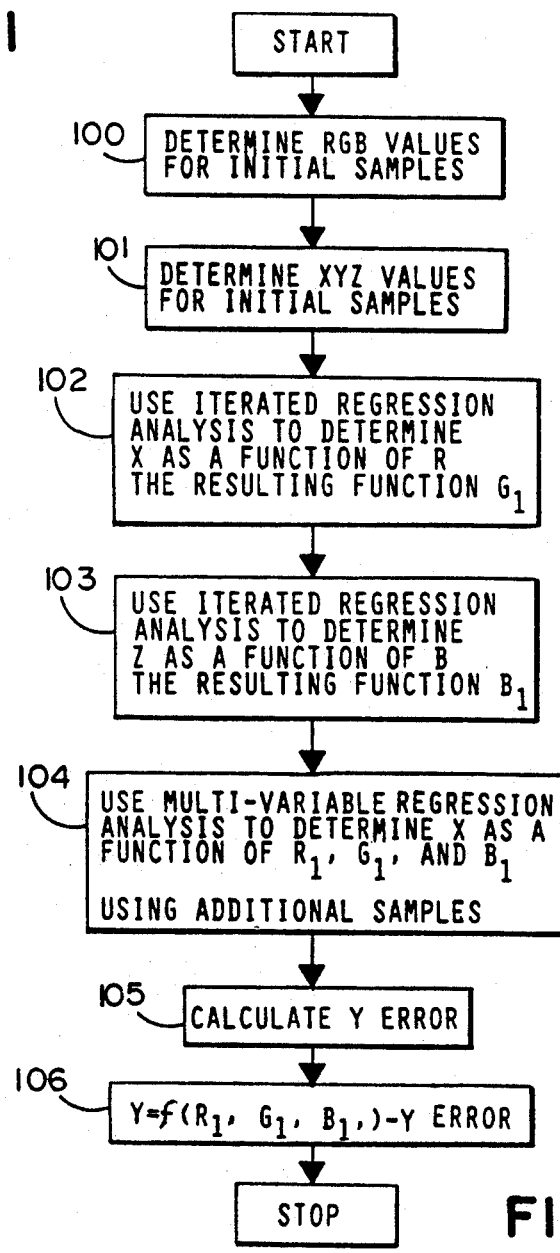
FIG. 2 is a flow diagram of a program for the system illustrated in FIG. 1.

To determine empirically a mathematical relationship between tristimulus coordinates and RGB coordinates for each video camera 10 (FIG. 1), empirically measured values of R, G, and B are analyzed and compared in controller 11 with empirically measured X, Y, and Z values supplied at XYZ input 12 in the sequence and in accordance with the process and method described herein with respect to FIG. 2.

The first step in the process is to determine the RGB values in block 100 (FIG. 2) and XYZ values in block 101 for a large number of colors and color intensities. For this purpose a set of standard color reference samples is, such as the Munsell color reference samples, can be used. This set of samples includes a large number (up to 1,600) of samples of standard reference colors. The RGB values are determined by the instrument being used for testing, which is typically a conventional video camera 10 and digitizing equipment capable of detecting and reporting numeric values for the RGB components of each color. XYZ values can be determined by the use of conventional colorimeter or spectrophotometer equipment. The XYZ data from a colorimeter or spectrophotometer can be converted by conventional equipment and software to provide CIELAB and CIELUV color values.

The number of color samples used for reference data should be large enough to produce statistically significant results. The Munsell reference colors permit the use of up to about 1,600 color reference samples. Approximately 186 samples have been found to provide good results. More than 100 samples may be necessary, because some tests with only about 100 samples resulted in a tenfold increase in the error factor for the determinations.

As a first step in the analysis, iterated regression analysis is performed to find the most confident value (i.e., the value with the highest correlation) of X as a function of R in block 102, Y as a function of G in block 103, and Z as a function of B in block 104, using only sample points located on the so-called "gray scale", where R, G, and B values are approximately equal and there is a fixed relationship among the X, Y, and Z values. There are approximately 37 colors on the gray scale in the Munsell reference sampling ranging from black to white. The resulting functions are power functions and are identified herein as $R_1$, $G_1$, and $B_1$.

The power functions $R_1$, $G_1$, and $B_1$ desirably are determined by the use of iterated regressions, which is the repeated application of a known process for determining the closest power function for a given variable.

For purposes of most correlations, the value of Z thus calculated ($Z_{est}=B_1$) is sufficiently accurate. The values of X and Y, however, require further development. If it were necessary to determine Zest as a function of RGB values with greater accuracy or correlation than the $B_1$ function, the additional regression analyses performed for X and Y herein would be used for Z.

By multi-variable regression analysis, an $X_{est}$ function is determined as a function of $R_1$, $G_1$, and $B_1$, using reference colors 14 (FIG. 1) that include colors where the three RGB colors are not the same in addition to the gray scale colors in block 105. This value of X generally correlates to R, G, and B values with sufficient accuracy for most color analysis and comparison purposes. Again, further regression analyses could be performed if a higher degree of accuracy or correlation were desired.

The value of Y is more difficult to ascertain. An intermediate function $Y_{est}$ is first calculated in accordance with the same method for calculating $X_{est}$, using multi-variable regression analysis on the functions of $R_1$, $G_1$, and $B_1$, with colors where the RGB colors include colors that are not equal in value in block 106. This, however, provides an intermediate value Yl with inadequate correlation. To correct this value, Y is first desirably analyzed as a function of $Y_1$ by further regression analysis to produce Yest2. The Yest2 function plots on a graph as a straight line relative to Y with a slope of one (1) and an axis intercept of zero (0). However, when the function is applied to the points, the resulting points are still unacceptably scattered.

An important feature of the present invention is the discovery that the scatter or error in Y is correlated to the value of a quantity which is called herein the "red chroma" or red saturation, with the value of the Y error showing a strong correlation to the red chroma value. The red chroma or red saturation value can be determined in one of several ways and still improve results. It could be determined by dividing R by the sum of R, G, and B (R/(R+G+B)) with satisfactory results. Better results are obtained if red chroma is defined as R/G. Still better results are obtained by defining red chroma as R1 - G1 This formula is used in the preferred practice of the present invention, although other formulas might be satisfactory.

The relationship between the error or scatter in Y (which is the difference between the Y regression function used [$Y_{est}$ or preferably Yest2] and Y) and the red chroma value is then ascertained by regression analysis, producing an error function $Y_{err}$. The error function is then subtracted from the $Y_{est}$ or preferably $Y_{est2}$ value previously calculated, and the resultant expression correlates closely with measured values of Y in block 108.

Summarizing the foregoing steps, values of X, Y, and Z are determined to be the following functions of R, G, and B:

$Z$ = a function of $B_1$ $X$ = a function of $R_1$, $G_1$, and $B_1$ $Y$ = a function of $Y_{est}$, which is a function of $R_1$, $G_1$, $B_1$ (or preferably $Y_{est2}$, which is a second regression performed on $Y_{est}$), less an error function $Y_{err}$ where $R_1$ = power function of R; $G_1$ = power function of G; and $B_1$ = power function of B.

The regression formulas used for the present analyses are conventional regression formulas and need not be repeated herein. The iterated regression methods used involve performing a standard regression with a variable parameter (i.e., the power applied to the independent variable) set to a particular value. This regression yields a confidence, which is a probability (0–1) that the regression relation is true for all points in the regression. The variable parameter is then increased by an interval to produce a high value and decreased by the same interval to produce a low value. The regression is repeated with each of these values to produce an upper-value confidence and a lower-value confidence. If either confidence is greater than the original confidence, the parameter is set to the corresponding value, and the process is repeated. If neither confidence is greater, the interval is cut in half, and the process is repeated until the interval reaches an arbitrarily small limit.

Once tristimulus coordinates are determined for corresponding RGB values of a particular video camera 10, conventional mathematical formulas can be used to calculate CIELAB values or values of other related coordinated systems.

In computerized color analysis and comparison systems that have been designed to operate on RGB values and provide output data in terms of RGB values, the method of the present invention can be embodied in a computer program using ordinary programming techniques in order to convert RGB values for a particular color video camera into standard CIELAB or tristimulus values that may be more meaningful to the equipment operator.

With the foregoing analysis, a correlation between video RGB values and XYZ values can be produced with a high degree of accuracy. Additional regression analyses could be performed to produce even more accurate results, if desired. For example, it may be possible to deduct an error function representative of the blue or green chroma value from the X value to produce an even more accurate correlation between X and RGB values, along the lines of the red chroma correction used for determining Y values.

The foregoing is merely exemplary of the preferred practice of the present invention, and various changes and additions may be made in the method described herein without departing from the spirit and scope of the present invention.

The embodiments of the present invention in which an exclusive property or privilege is claimed are defined as follows:

1. A method of generating tristimulus XYZ values from an image, comprising the steps of:
   generating initial RGB values from initial color samples using a video camera, said initial colors having known tristimulus XYZ values;
   using regression analysis on said RGB values and said known XYZ values to generate an initial function $R_1$ which represents an initial estimate of X as a function of R, an initial function $G_1$ which represents an initial estimate of Y as a function of G, and an initial function $B_1$ which represents an initial estimate of Z as a functions of B;
   generating additional RGB values from additional color samples using said video camera, said additionally colors having known tristimulus values;
   using regression analysis to generate an $X_{est}$ function as a function of said $R_1$, $G_1$, and $B_1$ functions, and a $Z_{est}$ function as a function of said $B_1$ function based on said additional RGB values and said additional XYZ values;
   generating image RGB values from said image using said video camera, and outputting XYZ values for said image corresponding to said image RGB values by using said $R_1$, $G_1$, $Z_1$, $X_{est}$, and $Z_{est}$ functions.

2. The method as defined in claim 1 wherein said initial colors are grey scale colors.

3. The method as defined in claim 1 further including the step of generating an improved estimate of Y as a function of a red chroma function r.

4. The method as defined in claim 3, wherein in said step of generating an improved estimate of Y, regression analysis is used to generate an error function which is a function of the scatter of Y and said red chroma function.

5. The method as defined in claim 4, wherein said scatter of Y is a function of $Y_{est}$ and said additional known Y values.

6. The method as defined in claim 3 wherein said red chroma function is a function of the difference between $R_1$ and $G_1$.

7. A method of generating tristimulus XYZ values from an image, comprising the steps of:
   generating RGB values from colors on the grey scale using a video camera;
   inputting known tristimulus XYZ values for said grey scale colors;
   using regression analysis to generate an initial function $R_1$ which is an initial estimate of X as a function of R, an initial function $G_1$ which is an initial estimate of Y as a function of G, and an initial function $B_1$ which is an initial estimate of Z as a function of B, using said RGB values and said known tristimulus XYZ values;
   generating additional RGB values from additional colors which are not on the grey scale;
   inputting additional known tristimulus XYZ values for said additional colors;
   using regression analysis to generate $X_{est}$, $Y_{est}$ and $Z_{est}$ functions which represent an estimate of X, Y and Z as a function of $R_1$, $G_1$, and $B_1$, using said additional RGB and XYZ values;
   generating image RGB values from images using said video camera, and outputting XYZ values corresponding to said image RGB values using said $X_{est}$, $Y_{est}$, $Z_{est}$, $R_1$, $G_1$, and $B_1$.

8. The method as defined in claim 7 further including the step of generating an improved estimate of Y as a function of a red chroma function r.

9. The method as defined in claim 8, said step of generating an improved estimate of Y includes regression analysis to generate an error function as a function of the scatter of Y and the red chroma function.

10. The method as defined in claim 8 wherein said red chroma function is defined as the difference between $R_1$ and $G_1$.

11. A method of generating tristimulus XYZ values from an image, comprising the steps of:

generating RGB values from reference colors using a video camera;

inputting known tristimulus XYZ values for said reference colors;

using regression analysis to generate an initial function $R_1$ which is an estimate of X as a function of R, an initial function $G_1$ which is an estimate of Y as a function of G; and an initial function $B_1$ which is an estimate of Z as a function of B, from said RGB and XYZ values;

using regression analysis to generate an estimate function $X_{est}$ as a function of $R_1$, $G_1$, and $B_1$, an estimate function $Y_{est}$ as a function $R_1$, $G_1$, and $B_1$, and an estimate $Z_{est}$ as a function of $B_1$;

generating an improved estimate of Y as a function of the red chroma in said reference colors; and generating image RGB values from objects imaged using said video camera, and outputting XYZ values corresponding to said image RGB values using $X_{est}$, $Z_{est}$, $R_1$, $G_1$, $B_1$, and said improved estimate of Y.

12. A method of generating tristimulus XYZ image values from an image, comprising the steps of:

generating RGB values from said image using a video camera;

generating an initial estimate of X as a function of R, generating an initial estimate of Y as a function of G, and generating an initial estimate of Z as a function of B, by using said RGB values generated by said video camera;

generating an improved X value as a function of the said initial estimates of X, Y and Z, generating an improved Y value as a function of said estimates of X, Y and Z, and generating an improved Z value as a function of said estimate of Z; and outputting said improved X, Y and Z values as said XYZ image values.

13. The method as defined in claim 12 wherein said step of generating an improved value of Y includes the step of refining said initial estimate of Y as a function of a red chroma value r.

14. The method as defined in claim 13, wherein the refined value of Y is a function of the scatter of Y and a red chroma function.

15. The method as defined inn claim 13 wherein said red chroma value is the difference between the initial value of X and the initial value of Y.

16. A method of generating tristimulus XYZ image values from an image, comprising the steps of:

generating RGB values from said image using video camera;

generating an initial estimate of X as a function of R, generating an initial estimate of Y as a function of G, and generating an initial estimate of Z as a function of B, from said RGB values;

generating an improved estimate of X as a function of the initial estimates of X, Y and Z, and generating an improved estimate of Y as a function of the initial estimates of X, Y and Z;

generating a refined estimate of Y as a function of a red chroma value; and outputting said estimate of Z, said improved estimate of X, and said refined estimate of Y as said image XYZ values.

* * * * *

UNITED STATES PATENT AND TRADEMARK OFFICE
CERTIFICATE OF CORRECTION

PATENT NO. : 5,150,199

DATED : September 22, 1992

INVENTOR(S) : Martin L. Shoemaker, et al.

It is certified that error appears in the above-identified patent and that said Letters Patent is hereby corrected as shown below:

Column 1, line 35;
  "CIEIAB" should be -- CIELAB --.
Column 2, line 47;
  Before paragraph "The present invention..." insert -- SUMMARY OF THE INVENTION --.
Column 3, line 42;
  "samples is" should be -- samples 13 --.
Column 4, line 15;
  "Zest" should be -- $Z_{est}$ --.
Column 4, line 35;
  "Y1" should be -- $Y_1$ --.
Column 4, line 38;
  "Yest$_2$" should be -- $Y_{est2}$ -- (both occurences).
Column 4, line 38;
  After "Yest$_2$" (first occurence) insert -- in block 106 --.
Column 4, line 55;
  "R1-G1" should be -- $R_1$-$G_1$. --.
Column 4, line 60;
  "Yest$_2$" should be -- $Y_{est2}$ --.
Column 4, line 62;
  After "$Y_{err}$" insert -- in block 107 --.
Column 5, line 4;
  "Yest$_2$" should be -- $Y_{est2}$ --.
Column 8, line 12, claim 15;
  "inn" should be -- in --.

UNITED STATES PATENT AND TRADEMARK OFFICE
CERTIFICATE OF CORRECTION

PATENT NO. : 5,150,199
DATED : September 22, 1992
INVENTOR(S) : Martin L. Shoemaker, et. al.

It is certified that error appears in the above-indentified patent and that said Letters Patent is hereby corrected as shown below:

Column 8, line 17, claim 16; After "using" insert -- a --.

Signed and Sealed this

Ninth Day of November, 1993

*Attest:*

*Attesting Officer*

BRUCE LEHMAN

Commissioner of Patents and Trademarks